United States Patent [19]

Motegi

[11] Patent Number: 4,697,235
[45] Date of Patent: Sep. 29, 1987

[54] LIST VECTOR CONTROL APPARATUS
[75] Inventor: Masanori Motegi, Kawasaki, Japan
[73] Assignee: Fujitsu Limited, Kawasaki, Japan
[21] Appl. No.: 591,543
[22] Filed: Mar. 20, 1984
[30] Foreign Application Priority Data Mar. 22, 1983 [JP] Japan ................. 58-047408
Mar. 28, 1983 [JP] Japan ................. 58-051887

[51] Int. Cl.[4] .......................................... G06F 15/347
[52] U.S. Cl. ..................................... 364/200; 364/730
[58] Field of Search ... 364/200 MS File, 900 MS File, 364/730

[56] References Cited
U.S. PATENT DOCUMENTS
4,293,941 10/1981 Murakoa et al. ................. 364/200

FOREIGN PATENT DOCUMENTS
0044562 7/1981 European Pat. Off. .
84301930 6/1986 European Pat. Off. .

OTHER PUBLICATIONS
CDC Cyber 200 Model 205 Computer System, Hardware Reference Manual, Control Data Corporation, 1980, pp. 4-113–4-116.
Uchida et al., "The Facom 230-75 Array Processor System", 3rd USA-Japan Computer Conf., 1978, pp. 369-373.

Primary Examiner—Archie E. Williams, Jr.
Assistant Examiner—Michael J. Ure
Attorney, Agent, or Firm—Staas & Halsey

[57] ABSTRACT

A list vector control apparatus to be incorporated in a vector processing system includes therein at least a plurality of vector registers. One of the vector registers is operated as a list vector register loading therein list vector elements, while another vector register is operated as a normal vector register to produce list vector data successively with the aid of its address register. The address register is connected to a list vector transfer line for transferring the list vector elements sequentially from the list vector register to produce the desired list vector data.

15 Claims, 11 Drawing Figures

LIST VECTOR CONTROL APPARATUS

BACKGROUND OF THE INVENTION

1. Field of the Invention

The present invention relates to a vector data control apparatus, more particularly to an apparatus dealing with vector data having a list structure.

2. Description of the Prior Art

To realize a system for high speed processing of a great amount of data, such as in scientific or technical calculations, it is not sufficient to merely combine typical and conventional general purpose arithmetic units (general purpose computers). To overcome this problem, there has been proposed the concept of a "vector instruction", i.e., an instruction which can process a great amount of data through a single instruction.

Arithmetic units which execute vector instructions are basically operated under the so-called pipeline processing method. The pipeline processing method is a well known method in which sequential data are continuously supplied, one by one, into a plurality of arithmetic stages connected in series with each other, whereby respective resultant data are obtained, one by one, continuously. A vector instruction initiates vector processing. Vector processing in a computer is usually achieved by means of, at least, a plurality of vector registers, a main memory, a plurality of arithmetic units, and means for controlling the operation of the vector registers. The present invention primarily relates to such means.

In the prior art, vector processing is achieved by reading and writing operand data from and to the main memory at a very high speed using a so-called interleave method. In current vector processing, use of the interleave method has no adverse effects on the vector processing since current vector processing is achieved with the use of successive vector data supplied in a regular order. Therefore, the inherent merit of the interleave method, i.e., highly increased thruput of data, can be enjoyed to the fullest along with the usual vector processing.

A problem arises, however, when the vector processing is carried out with the use of vector data supplied not in regular order, but in random order. Such a random order often occurs when the vector data are set up in a so-called list structure. Under such circumstances, there is a likelihood of random specification of the vector data along with the list expression. This necessarily results in random access for the main memory. Accordindly, deleterious bank conflict occurs in the main memory. When such a bank conflict occurs, further, the inherent merit of the interleave method is greatly reduced.

SUMMARY OF THE INVENTION

It is an object of the present invention to provide a list vector control apparatus which can overcome the above problem, in which vector processing is achieved without bank conflict in the main memory even when the list vector data, i.e., random vector data, are handled under the interleave method, and, thus, the thruput of the related computer is maintained at the level of supplied vector processing in which vector data are given in regular order.

The above object is attained by the following. In a list vector control apparatus including a plurality of vector registers to be controlled, an arbitrary one of the vector registers is made operative to load therein a set of list vectors, as elements, supplied from the main memory. At least one of the remaining vector registers is made operative to load therein a set of vector data, as elements, supplied from the main memory. These elements of vector data conform to and are specified by the elements of the list vector. The vector register for storing the vector data is sequentially accessed by each address successively supplied from an address register pertaining thereto. The address register momentarily stores each list vector as each address, transferred from the vector register for storing the list vectors successively.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Figure 1:
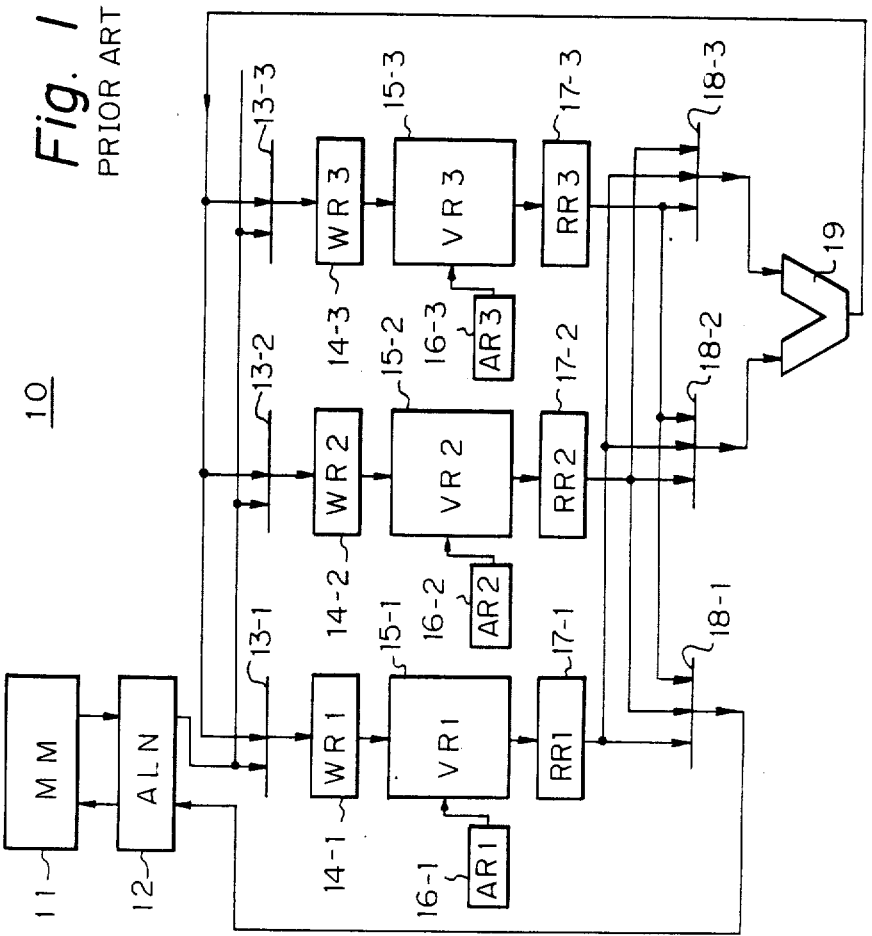
FIG. 1 is a schematic block diagram of a current vector processor system in which the present invention may be incorporated.

Before describing the preferred embodiments, a discussion will be made of a related prior art system for reference. FIG. 1 is a schematic block diagram of a current vector processor system 10 into which the present invention may be incorporated. Reference numeral 11 represents a main memory (MM) set up with a plurality of banks. The main memory 11 is connected to an aligner (ALN) 12 which momentarily stores each item of vector data read from the memory 11 under the interleave method. The aligner 12 aligns the read data and distributes it to the related vector register (mentioned below). OR gates 13-1 through 13-3, cooperating with gates (such as shown by G and the like in FIG. 9), selectively allow corresponding read data to pass therethrough according to an instruction. The number of OR gates and members pertaining thereto is not limited to three, as illustrated, but may be four or more.

Write vector data registers (WR1, WR2, WR3) 14-1 through 14-3 momentarily store data passed through the OR gates 13-1 through 13-3, respectively. The data are loaded in individual vector registers (VR1, VR2, VR3)

15-1 through 15-3. The loaded data are read and momentarily stored in individual read vector data registers (RR1, RR2, RR3) 17-1 through 17-3. OR gates 18-1 through 18-3, cooperating with gates such as shown by SG10, SG11, and the like in FIG. 10, allow corresponding read data from the registers 17-1 through 17-3 to pass therethrough according to an instruction. Address registers (AR1, AR2, AR3) 16-1 through 16-3 produce addresses for accessing individual segmented register area in the vector registers 15-1 through 15-3 at a predetermined timing. Each address is incremented and renewed one by one (+1) successively in order to specify each one of the segmented register areas contained in each vector register (VR).

First, a vector load instruction is supplied from a program memory (not shown) as usual. Then, the vector data items are read from the main memory 11 under the interleave method. Then each of the thus read vector data is distributed, by means of the aligner 12, to one of the vector registers 14-1 through 14-3, which register is specified by the previous load instruction by way of a corresponding OR gate and write vector register (WR). The successive vector data items from this write vector register segment are sequentially loaded in the register areas of the related vector register (VR) sequentially specified by the address register (AR).

Figure 2:
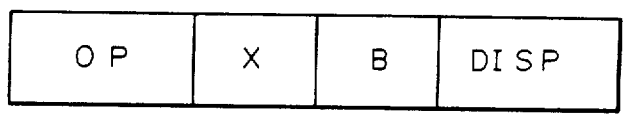
FIG. 2 depicts an example of a data pattern of a load instruction.

FIG. 2 depicts an example of a data pattern format of the load instruction. The load instruction determines the destination register among the available vector registers 15-1 through 15-3. In FIG. 2, character "OP" denotes an operation code now indicating "load instruction", X denotes a destination, e.g., the vector register 15-2, B denotes a register (not shown) storing a base address of a source, and DISP denotes a displacement to be added to the base address to specify a beginning address in the main memory.

Figure 3:
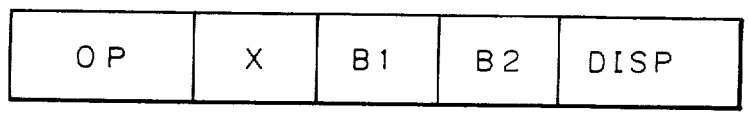
FIG. 3 depicts an example of a data pattern of a vector add instruction.

Assuming that a vector add operation is to be executed in the system 10 of FIG. 1, according to a vector add instruction, with the use of the vector data loaded in the vector registers (VR), first, the data in, for example, the vector register 15-2 and the data in, for example the vector register 15-3 are read therefrom in accordance with the addresses supplied from the address registers 16-2 and 16-3, respectively. The thus read data are applied to a vector arithmetic unit 19 via, on one hand, the read register 17-2 and the OR gate 18-2 and via, on the other hand, the read register 17-3 and the OR gate 18-3. The resultant data from the unit 19 are sequentially fed back to and loaded in a specified vector register 15-1, at the segmented register area specified by the address register 16-1, via the OR gate 13-1. FIG. 3 depicts an example of a data pattern or format of the vector add instruction. The operation code OP indicates the above-mentioned "vector add instruction", the code X indicates the destination, i.e., the above-mentioned vector register 15-1, and the codes B1 and B2 indicate the sources, i.e., the vector registers 15-2 and 15-3, respectively. The DISP is not used in this instruction.

Thereafter, a vector store instruction is supplied from the program memory in the normal sequence. According to the vector store instruction, the resultant data is stored, by way of the read register 17-1 and the OR gate 18-1, into the main memory 11. The above-mentioned load instruction, vector add instruction, and store instruction are executed for each vector data cyclicly. Thus, successive vector add operations are completed, which operations are basic operations achieved in the vector processor system 10. The system, however, suffers from bank conflict and attendant problems when the vector data in the main memory 11 have the list structure and are read therefrom under the interleave method.

Figure 4:
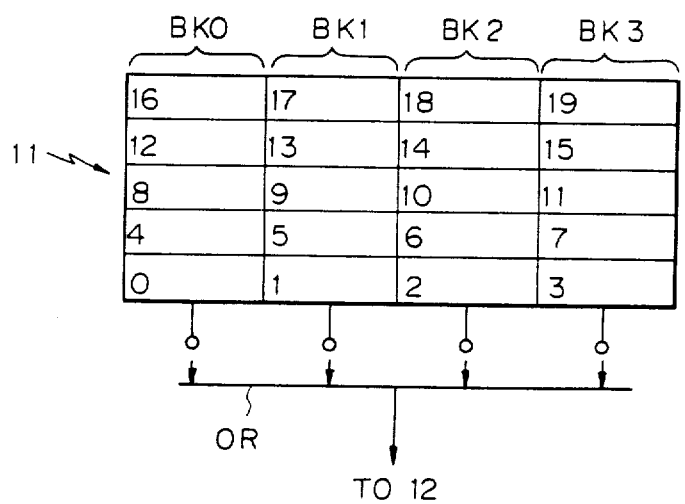
FIG. 4 schematically illustrates the inner construction of a main memory set up with banks under a four-way interleave method.

FIG. 4 schematically illustrates the inner construction of the main memory 11 set up with banks under a four-way interleave method. Under the four-way interleave method, the main memory 11 is segmented into four banks BK0 through BK3. In the banks, many elements (0, 1, 2, 3, and so on), i.e., vector data having the list structure, are shared, as illustrated. Selected elements are sequentially supplied, via an OR gate, to the aligner 12.

Figure 5A:
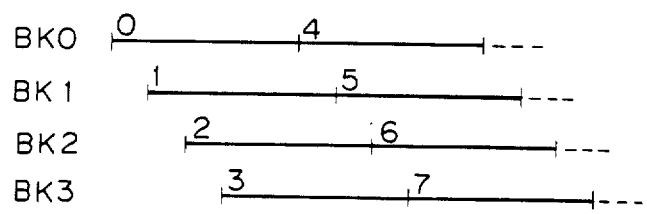
FIGS. 5A and 5B schematically show read element flows in a usual or normal mode and a list mode, respectively.
Figure 5B:
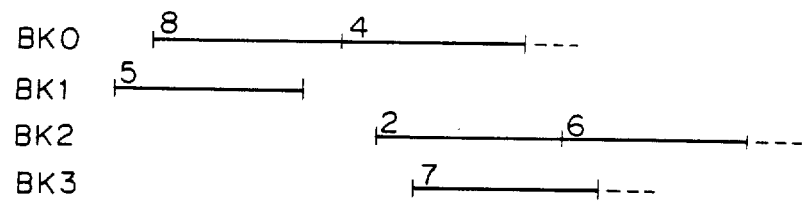

FIGS. 5A and 5B schematically show read element flow under the usual mode and the list mode, respectively. Under the usual mode, the elements are accessed in regular order, as illustrated by numerals (0, 1, 2, 3), (4, 5, 6, 7)—in FIG. 5A. This means that there is no bank conflict under the usual mode. Contrary to the above, under the list structure mode, the elements are not accessed in any regular order, but are accessed randomly in accordance with the order of the list. FIG. 5B shows a case where the elements 5, 8, 4, 2, 7, 6—are specified sequentially using the list structure mode. Attention should be paid to the elements 8 and 4 in the bank BK0 and also the elements 2 and 6 in the bank BK2. These mean bank conflicts. Therefore, the elements 4 and 6 must wait for the completion of the preceding and conflicting elements 8 and 2, respectively, since two or more vector data items cannot be read from the same bank simultaneously. This reduces the thruput of the system 10.

Figure 6:
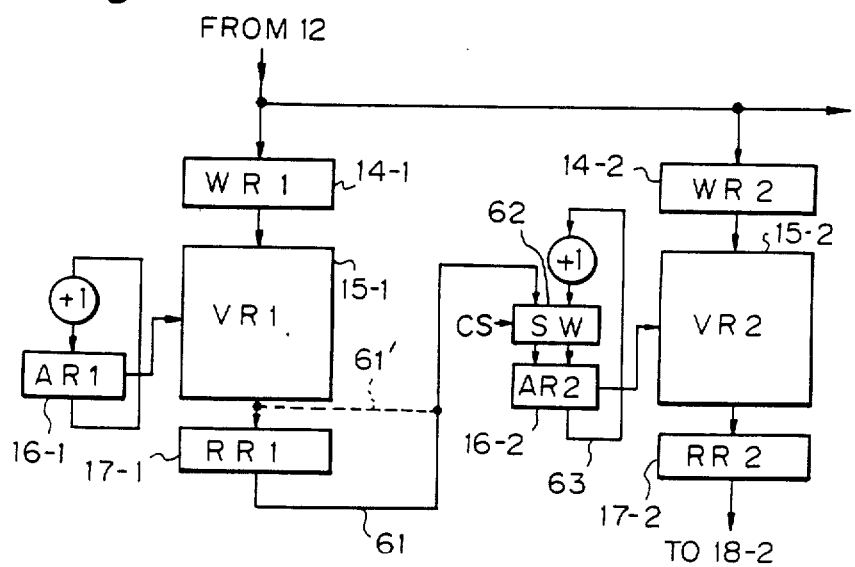
FIG. 6 is a block diagram for explaining the principle according to the present invention.

FIG. 6 is a block diagram for explaining the principle according to the present invention. In FIG. 6, members identical to those of previous figures are represented by the same reference numerals or symbols (same for later figures). The point here is that, an arbitrary one of the vector registers, e.g., 15-1, is made operative to load therein a set of list vectors, as the elements, supplied from the main memory 11 (FIG. 1), while the other vector register 15-2 is made operative to load therein a set of vector data, as the elements, also supplied from the main memory 11. The vector data elements correspond to the list vector elements. The list vector register 15-1 produces the list vector elements therefrom sequentially with the aid of its address register 16-1, producing addresses one by one incrementally for accessing the list vector register 15-1, as in the normal manner.

The thus read list vector elements are supplied directly to the other address register 16-2 of the other register 15-2 via a list vector transfer line 61 and a switcher (SW) 62. The switcher 62 selects one of the two lines with a control signal CS, generated according from an instruction. One of the two lines is the above-mentioned line 61, and the other is the address increment line 63. When list vector processing is to be executed, the switcher 62 connects the line 61 with the address register 16-2 in accordance with the control signal CS. When usual vector processing is to be executed, the switcher 62 operates to close the loop of the line 63. This enables the vector register 15-2 to read out its loaded vector data elements, in accordance with each of the list vector elements stored in its register 16-2.

No bank conflict occurs, because the list vector control is not performed in the main memory 11 (FIG. 1), but outside the memory 11. Further, there is no situation in the vector registers equivalent to a bank conflict where two or more vector data elements are accessed in the register 15-1 at one time, since each address is given sequentially one by one from the register 15-1, in accordance with the list.

The instruction for the above-mentioned list vector transfer operation is similar to that shown in FIG. 2. The operand OP of FIG. 2 specifies a load instruction, the code X specifies the destination register 16-2, and the code B specifies the source register 16-1. The load instruction also instructs generation of the control signal CS of logic "1" to select the line 61 by the normal instruction decoder. The vector data from the register 15-2, each corresponding to individual list vector elements, are called "list vector data" and are the same as those obtained under the normal list vector processing controlled inside the main memory 11.

The list vector elements from the register 15-1 can alternatively be sent directly to the register 16-2, i.e., not via the read register 17-1, by way of a list vector transfer line 61' indicated by a broken line.

Figure 7:
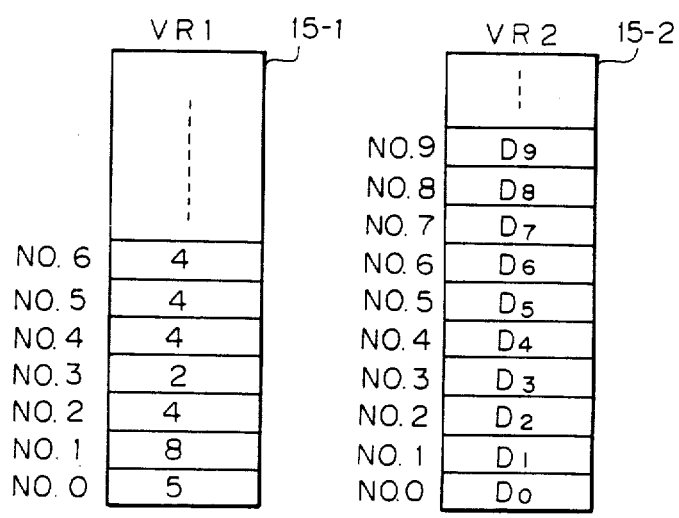
FIG. 7 depicts a data arrangement in registers in FIG. 6.

FIG. 7 depicts a data arrangement in the registers 15-1 and 15-2 in FIG. 6. In the register (VR1) 15-1, the list vector elements are loaded. In the register (VR2) 15-2, the inherent or associated vector data elements $D_0$, $D_1$, $D_2$—are loaded. Assuming that the list vector elements having the list of 5, 8, 4, 2, 4, 4, 4—are loaded, in that order, in the register 15-1, the corresponding inherent vector data elements $D_5$, $D_8$, $D_4$, $D_2$, $D_4$, $D_4$, $D_4$, $D_4$—are sequentially read from the register 15-2 associated with the lists 5, 8, 4,—, as individual addresses for the register 15-2. Thus, list vector accessing can be established as intended. Incidentally, the list vector concerned is disclosed in, for example, a hardware reference manual by CONTROL DATA Ltd, entitled "CDC CYBER 200 MODEL 205 COMPUTER SYSTEM", especially pages 4-113 thereof.

Figure 8:
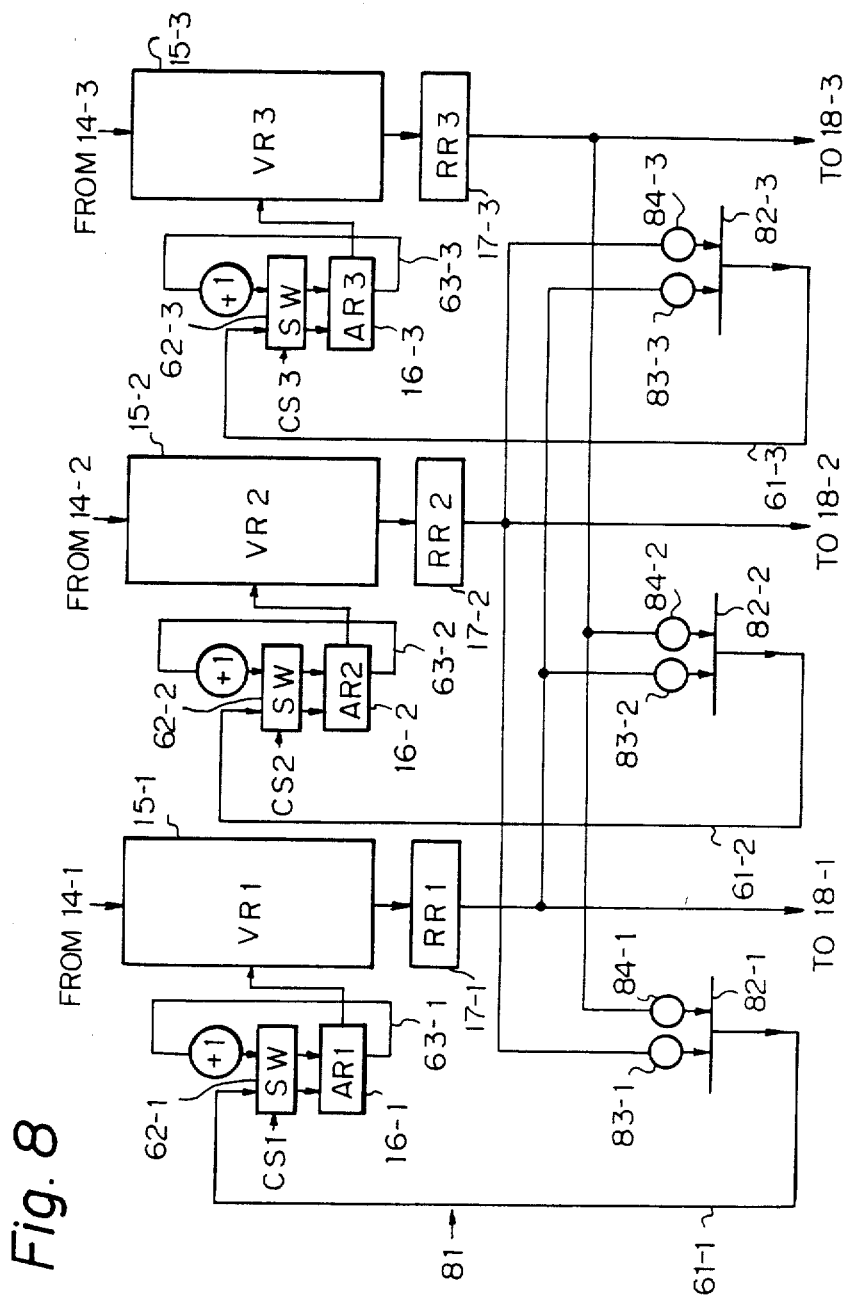
FIG. 8 is a block diagram of a control apparatus according to a first embodiment of the present invention.

FIG. 8 is a block diagram of a control apparatus according to a first embodiment of the present invention. The control system 81 diagrammed therein is that in the case of three vector registers and their peripheral control circuits. List vector transfer lines 61-1 through 61-3 are employed. The lines 16-1 through 61-3 are connected to individual OR gates 82-1 through 82-3 at their outputs, respectively. The OR gates 82-1 through 82-3 are provided at their inputs with input gates 83-1 and 84-1; 83-2 and 84-2; and 83-3 and 84-3, respectively, which input gates are controlled to close or open in response to individual gate control signals (not shown). When only the input gate 83-3 is opened, the data from the register 17-1 is supplied, via the OR gate 82-3, to the register 16-3.

Taking as an example a case where the vector processor system is used under the list vector structure mode, the vector register 15-3 is allotted to be the list vector register,and the vector register 15-1 is cooperates therewith for producing the list vector data therefrom. While register 15-2 functions to produce the vector data (not list structured vector data. First, only the input gate 84-2 is opened and only the switcher 62-1 is controlled to connect the list vector transfer line 61-1 with the address register 16-1 by the control signal CS1 of logic "1". Then, the list vector elements loaded in the list vector register 15-3 are sequentially supplied to the address register 16-1. Thereby, the vector register wiring becomes equivalent to that of FIG. 6, and an identical operation to that of FIG. 6 can be achieved therein.

A second embodiment according to the present invention will be mentioned below. The second embodiment is further improved over the first embodiment in view of thruput. The principle according to the second embodiment can be adapted by a person skilled in the art, to any N-way interleave method. However, the following explanation will be provided for the case of N=2 for simplicity.

Figure 9:
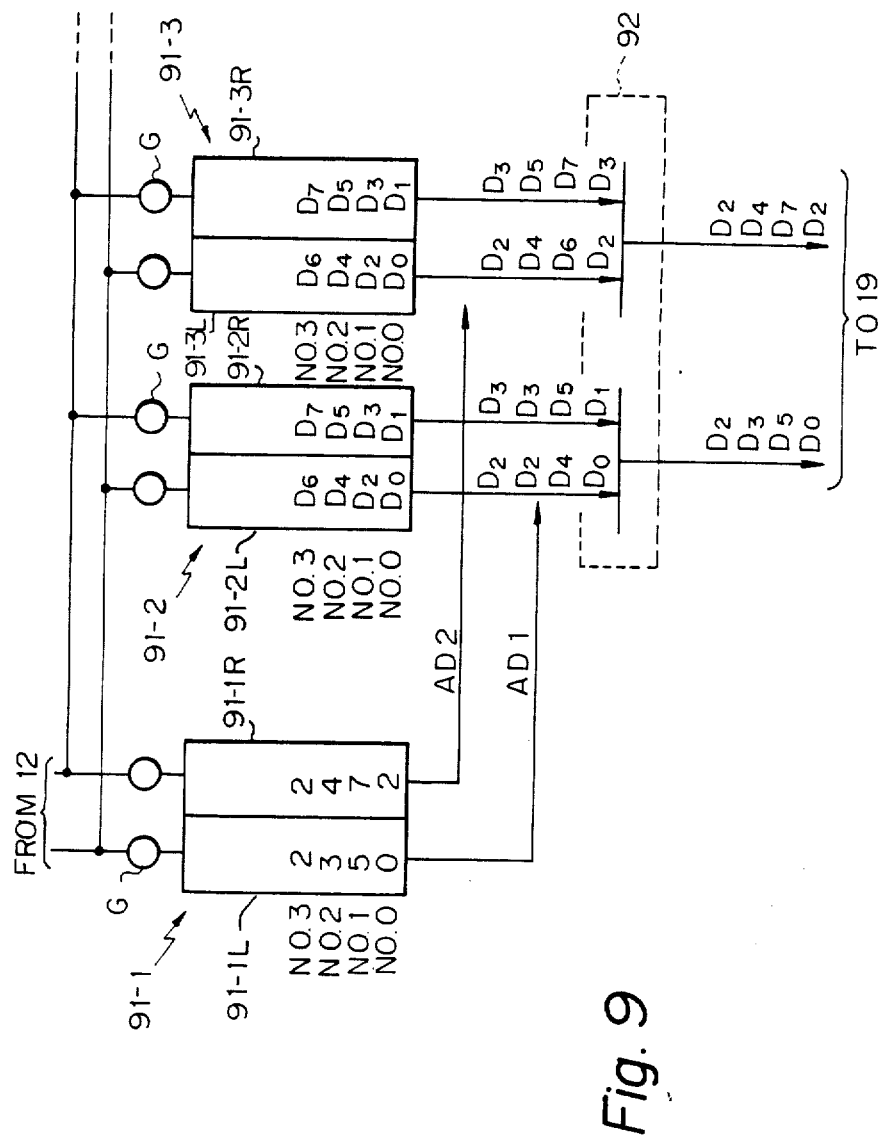
FIG. 9 is a block diagram for explaining the principle according to a second embodiment of the present invention.

FIG. 9 is a block diagram for explaining the principle according to the second embodiment of the present invention. Reference numeral 91-1 represents a vector register operative as the list vector register. Other vector registers 91-2 and 91-3 are operative as usual vector registers for producing list vector data according to the list. The register 91-1 may correspond to the register 15-1 of FIG. 6, and each of the registers 91-2 and 91-3 to the register 15-2 thereof. The read list vector data from the vector registers 91-2 and 91-3 are supplied, via individual OR gate means 92, to the following stage vector arithmetic unit 19 of FIG. 1.

In the second embodiment, elements having an individual element number M (M=0, 1, 2—) are sequentially supplied as usual from the main memory via gates G and are allotted to corresponding vector registers by means of the aligner 12 under an M modulo N process, where N is equivalent to the number N of the interleave method, i.e., 2 in the example. The thus allotted elements are depicted, for example, as 0, 2, 5, 7, 3, 4, 2, 2—and $D_0$, $D_1$, $D_2$, $D_3$, $D_4$, $D_5$, $D_6$, $D_7$—. The former indicates the list numerals specified by the sequentially read list vector elements. That is, the list vector elements 0, 1, 2, 3, 4, 5, 6, 7—contain the lists of the above-recited series 0, 2, 5, 7, 3, 4, 2, 2—, respectively. The latter indicates the sequentially read vector data contained in the vector data elements 0, 1, 2, 3, 4, 5, 6, 7—, respectively. The vector data ($D_0$, $D_1$—) in the register 91-3 are copies of those in the register 91-2.

In each of the vector registers, the left-side column register loads therein either one of odd or even numbered elements. In the example, each of the left column registers 91-1L, 91-2L, and 91-3L loads therein odd numbered (1, 3, 5—) vector elements, and each of the right column registers 91-1R, 91-2R, and 91-3R loads therein even numbered (0, 2, 4,—) elements. The vector data elements in the column registers 91-2L and 91-2R are accessed sequentially by receiving, as addresses AD1, the list vector elements from the left column register 91-1L. Similarly, the vector data elements in the column registers 91-3L and 91-3R are accessed sequentially by receiving, as addresses AD2, the list vector elements from the right column register 91-1R.

In detail, the vector register 91-2 is accessed by the upper bits, except for the least significant bit, of the list vector elements from the left column register 91-1L. Then, the thus accessed vector data are selected by the OR gate means 92 so that the even numbered vector data elements and the odd numbered vector data elements are selectively passed therethrough according to the least significant bit of "0" and "1", respectively.

Similarly, the vector register 91-3 is accessed by the upper bits, except for the least significant bit, of the list vector elements from the right column register 91-1R. Then, the thus accessed vector data are selected by the OR gate means 92 so that each even numbered vector data element and each odd numbered vector data element are selectively passed therethrough according to the least significant bit of "0" and "1", respectively.

To be specific, taking as an example the case where the vector register 91-2 is accessed by the even numbered list vector elements in the left column register 91-1L, the lists of 0, 5, 3, 2—are depicted, for example, as the even numbered list vector elements. The lists are expressed in three binary digits, as folows.

0 = "00 0"
5 = "10 1"
3 = "01 1"
2 = "01 0"

Thus, the upper two bits except for the least significant bit, i.e., "00"(=0), "10"(=2), "01"(=1), and "01"(=1), access the vector register 91-2, so that the vector data "$D_0\ D_1$" (corresponding to No. 0), "$D_4\ D_5$" (No. 2), "$D_2\ D_3$" (No. 1), and "$D_2\ D_3$" (No. 1) are provided from the register 91-2 in the order mentioned. Then, the thus accessed vector data of even and odd numbered vector elements are selected by the least significant bit of "0" and "1". The least significant bits indicate

"0"
"1"
"1"
"0"

as recited above. The least significant bits "0" and "1" select the left and right column register 91-2L and 91-2R, respectively, thereby producing the list vector data $D_0, D_5, D_3, D_2$, as illustrated, from the OR gate means 92, in the order mentioned in accordance with the lists of the list vector register 91-1L. This also applies to the lists of the right column register 91-1R (odd number list vector elements) in relation to the other vector register 91-3, to produce the list vector data $D_2, D_7, D_4, D_2$ from the OR gate means 92. As a result, the list vector data $D_0, D_2, D_5, D_7, D_3, D_4, D_2, D_2$—can be obtained, as intended, in accordance with the whole lists loaded in the list vector register 91-1. The succeeding operation is carried out, as usual, by means of the vector arithmetic unit 19 with the thus obtained list vector data.

Figure 10:
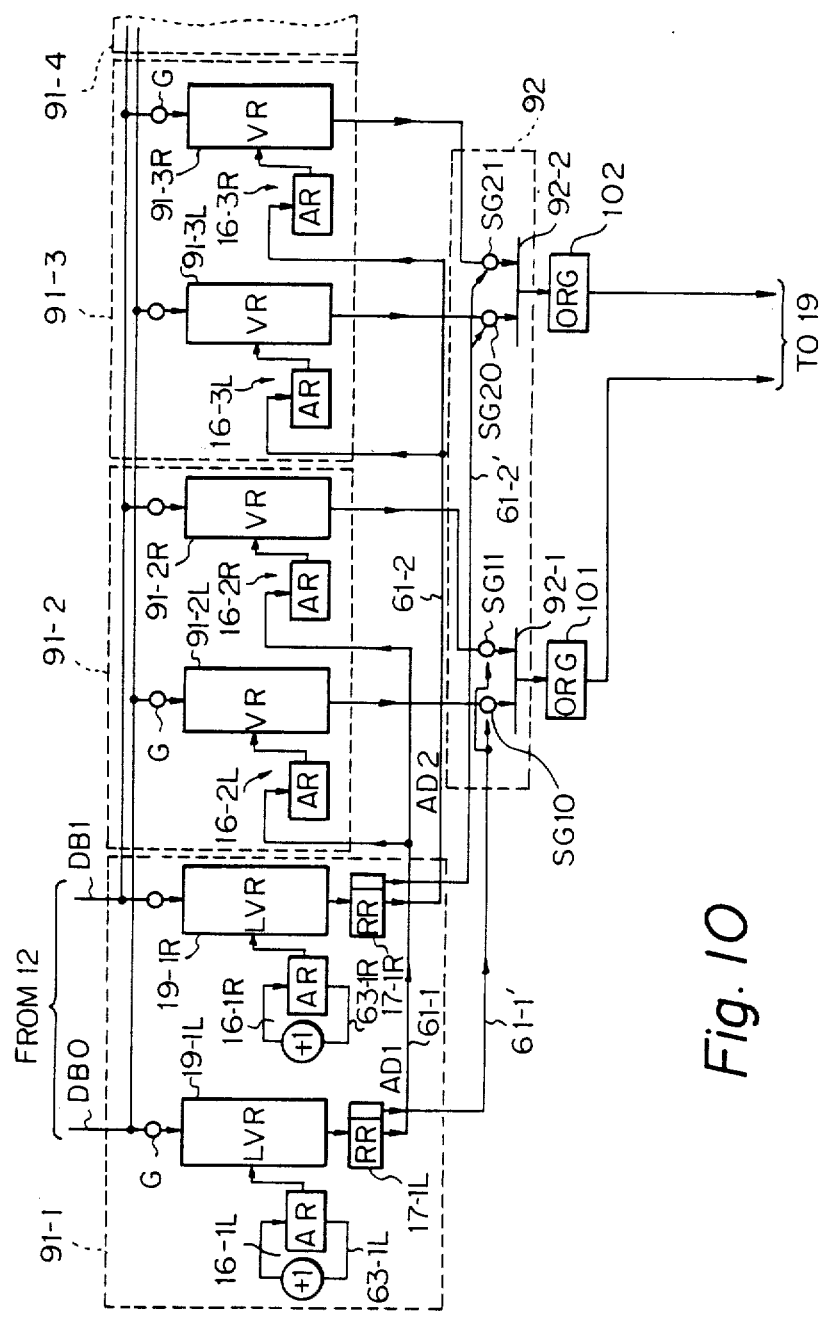
FIG. 10 is a detailed example of the arrangement shown in FIG. 9 according to the second embodiment of the present invention.

FIG. 10 is a detailed example of the arrangement shown in FIG. 9 according to the second embodiment of the present invention. In FIG. 10, the newly illustrated members are output registers (ORG) 101 and 102. The data buses DB0 and DB1 transfer the even numbered vector elements and the odd numbered elements, both sequentially supplied from the main memory set up with two banks BK0 and BK1, since a 2-way interleave method is adopted here. As previously mentioned, the vector elements are sequentially allotted to the vector register based on the M modulo N(=2) process. For example, the vector element of number M(=6) is allotted to the leftside (—0—side) column register, since in modulo N(=2) a residue of —0— results therefor (6/2=3—0—), while number M of the vector element, i.e., M(=7) is allotted to the right-side (—1—side) column register, since in modulo N(=2) residue of —1— results therefor (7/2=3—1—), with the use of the gate G being according to the related instruction similar to that shown in FIG. 2.

The list vector elements are sequentially read from the list vector column registers (LVR) 91-1L and 91-1R and momentarily stored one by one in the read vector data registers 17-1L and 17-1R, respectively. The upper bits of the list vector elements in the read registers 17-1L and 17-1R are transferred to the address registers 16-2L and 16-2R and the address registers 16-3L and 16-3R, via the list vector transfer lines 16-1 and 16-2, as individual addresses AD1 and AD2, respectively, for accessing the respective vector column register 91-2L, 2R and 91-3L, 3R. Thus, the list vector data are read and provided therefrom and then transferred to the OR gate means 92. At the same time, the least significant bit in each of the registers 17-1L and 17-1R is supplied via list vector transfer sub-lines 61-1' and 61-2', to individual selection gates SG10, SG11 and SG20, SG21, respectively. When the related least significant bit is "0", the gates SG10 and SG20 are opened. Alternatively, if "1", the gates SG11 and SG21 are opened. At each of OR gates 92-1 and 92-2, one of the even or odd numbered vector data elements is selected one by one to pass therethrough. Then, the list vector data are momentarily stored in the individual output registers 101 and 102 to supply them to the vector arithmetic unit 19. The resultant data from the unit 19 is sequentially fed back to another vector register 91-4.

If the main memory is set up with four banks and driven under the 4-way interleave method, each of the vector registers 91-1, 91-2, and 91-3 is comprised of four column vector registers. For example, the register 91-1 is comprised of four registers 91-1L, 91-1R, and so on, of four address registers 16-1L, 16-1R, and so on, of four read registers 17-1L, 17-R, and so on. The same applies to each of the registers 91-2 and 91-3. Further, there are four list vector transfer lines 61-1, 61-2, and so on, and there are four selection gates SG10, SG11, and so on for the selection OR gate 92-1. Also, four selection gates SG20, 21, and so on exist for the selection OR gate 92-2. In this case, each of the four list vector transfer sub-lines 61-1', 61-2', and so on transfers the two lowermost bits ("00", "01", "10", "11") of each list vector element in each read vector data register (17-1L, 17-1R—). These two bits are decoded by an appropriate decoder for producing four selection signals to open four corresponding selection gates.

In FIG. 10, although the address registers 16-1L, 16-1R, 16-2L, 16-2R, 16-3L, and 16-3R are illustrated with no peripheral circuits for the purpose of simplicity, in actuality, peripheral circuits such as the switchers 62-1, 62-2, 62-3, and the read registers 17-1, 17-2, 17-3 of FIG. 8 are provided therewith. This is because switchers are very useful when operating the system as a general-purpose vector processor adapted to run under a usual mode or list structure mode, as required.

It will be obvious that the present invention is not restricted to the above-mentioned embodiments and that many variations are possible for a person having ordinary skill in the art without departing from the scope of the present invention.

I claim:

1. A list vector control apparatus incorporated into a vector processor system comprising, at least a main memory segmented into N (where N is a positive integer equal to or larger than 2) number of banks to be accessed under an N-way interleave method, a plurality of vector registers for loading, from the main memory, successive vector elements therein, a plurality of address registers each connected to one of said vector registers, for accessing said vector elements located therein sequentially using address increment means, and a vector arithmetic unit receiving list vector data sequentially supplied from said vector registers to produce resultant data therefrom, said apparatus comprising:

one of said vector registers acting as a list vector register and storing therein a set of list vector elements supplied from said main memory;

at least one other of said vector registers acting as a list data vector register and storing therein, from said main memory, a set of vector data elements each corresponding to individual ones of said list vector elements, where said list vector elements indicate the order of the vector data elements; and at least one list vector transfer line, connected between the address register of said list data vector register and said list vector register, the list vector elements being sequentially transferred to and momentarily stored in the address register of said list data vector register, via said list vector transfer line, and used for accessing the vector data elements in said list data vector register specified thereby, to produce the list vector data.

2. An apparatus as set forth in claim 1, further comprising a switcher, connected to said list vector transfer line, said address increment means and the address register of said list data vector register, said address increment means connected to the address register of said list data vector register, and said switcher operative to connect either one of said list vector transfer line or said address increment means selectively with the address register of said list data vector register, the switcher selecting the list vector transfer line when list vector processing is to be executed in the vector processing system.

3. An apparatus as set forth in claim 2, wherein each vector register has an output stage and said list vector transfer line is connected between said switcher and the output stage of said list vector register.

4. An apparatus as set forth in claim 2, wherein said list vector register has an output stage and said apparatus further comprises a read vector data register having an output, and said list vector transfer line is connected between said switcher and the output of said read vector data register, and said read vector data register being connected to the output stage of said list vector register.

5. An apparatus as set forth in claim 4, wherein each vector register is provided with a switcher connected to its address register, address increment means connected to its switcher and address register, and a read vector data register connected to its output stage, and said apparatus further comprising as many OR gates as said vector registers, each OR gate having, at its input stage, input gates one less in number than the number of said vector registers and being connected at its output stage to a respective address register via the switcher, said input gates corresponding to each one of said vector registers being connected to said read vector data register of other non-corresponding said vector registers, where the connection of the one of said input gates connected to said list vector register is via said list vector transfer line being opened to pass therethrough said list vector elements, as addresses, from said read vector data register connected to the list vector register.

6. An apparatus as set forth in claim 1, wherein at least three vector registers are provided, one of the vector registers being operative as said list vector register, the other of said vector registers storing the same vector data elements and operating as vector data registers, being accessed by the list vector elements from the list vector register to produce therefrom said list vector data, said list vector register being segmented into N portions to form N list vector column registers, each of the other said vector registers being also segmented into N portions to form N vector column registers therein, each of said vector column registers storing therein said successive vector elements, from said main memory, distributed under an M module N (where M denotes an element number of each said vector elements) process, the vector data elements in each said vector column register being sequentially accessed by each of said list vector elements loaded in the corresponding list vector column register to produce the list vector data therefrom, said list vector transfer line being connected between the address registers of said list data vector registers and said list vector register.

7. An apparatus as set forth in claim 6, further comprising a read vector data register for and connected to each list vector column register, and connected to said list vector transfer line, said read vector data register, said address registers, and said list vector transfer line, each further comprising N read vector data registers, N address registers and N list vector transfer lines, respectively, and said address registers for individual ones of said N vector column registers being connected, via said list vector transfer lines, with said read vector data register for said list vector column register corresponding to said N vector column registers to commonly receive upper bits from each said list vector elements loaded in said read vector data register, while the lowermost bit or bits from each said list vector elements are transferred via a corresponding one of N list vector transfer sub-lines to gate means, the thus transferred lowermost bit or bits being used for selection of one of said list vector data accessed from each vector data register by the signals transferred on said list vector transfer line.

8. An apparatus as set forth in claim 7, wherein said gate means further comprises at least two selection gates connected respectively to two individual vector column registers of each vector data register for loading therefrom said vector data elements, when said two selection gates are used under an N(=2)— way interleave method, either one of the two selection gates being opened in accordance with the logic "1" or "0" of said lowermost bit.

9. An apparatus as set forth in claim 8, further comprising for each vector data register decoder means, connected to said list vector transfer sub-lines and said selection gates corresponding to each vector data register, for decoding said lowermost bits and when three or more selection gates are used under an N (=3, 4—)-way interleave method, any one of the three or more selection gates is opened in accordance with the logic of said lowermost bits by said decoder means.

10. An apparatus as set forth in claim 7, further comprising a switcher for each of said address registers of said vector column registers and address increment means connected to each of said address registers and its switcher, the switcher operative to connect either one of said list vector transfer line or said address increment means selectively with the corresponding address register, the switcher selecting the list vector transfer line when list vector processing is to be executed in the vector processing system.

11. A vector register system for list processing, comprising:
a first vector register for storing list elements;
a first address register, connected to said first vector register, for addressing said first vector register and causing the list elements to be output;

first increment means, connected to said first address register, for incrementing the contents of said first address register;

a second vector register for storing data elements associated with the list elements, the list elements indicating the order of the vector elements; and a second address register, connected to said first and second vector registers, for receiving the list elements and addressing said second address register therewith and causing output of the data elements in dependence upon the list elements.

12. A system as set forth in claim 11, further comprising:

second increment means, connected to said second address register, for incrementing said second address register; and switch means, connected to said first vector register, said second address register and said second increment means, for connecting said first vector register to said second address register during list processing.

13. A system as set forth in claim 12, further comprising:

a third vector register storing the list elements; and first gate means, connected to said first and third vector registers and said switch means, for connecting one of said first and third vector registers to said switch means via said first gate means in dependence upon which of said first and third vector registers containing the list elements, wherein said connection between said first vector register and said second address register is via said first gate means.

14. A system as set forth in claim 11, wherein said first vector register comprises a pair of list vector registers, said second vector register comprises a pair of data vector registers, said second address register comprises a pair of data address registers connected to corresponding data vector registers, and said system further comprises:

a pair of list vector output registers connected to said pair of list vector registers and one of said list vector output registers is connected to both of said pair of data address registers, forming said connection between said first vector register and said second address register; and second gate means, connected to said pair of data vector registers and the one of said list vector output registers, for selecting between said data vector registers in dependence on the contents of the one of said list vector output registers.

15. A system as set forth in claim 14, wherein least significant bits in the one of said list vector output registers determine which of said data vector registers is selected.

* * * * *